United States Patent
De Zaeytijd et al.

(10) Patent No.: US 12,001,763 B2
(45) Date of Patent: Jun. 4, 2024

(54) COMPUTER-IMPLEMENTED GENERATION OF AN ANALYTICAL MODEL OF A STRUCTURE

(71) Applicant: BRICSYS NV, Ghent (BE)

(72) Inventors: Jürgen De Zaeytijd, Merelbeke (BE); Chloë Guidi, Dendermonde (BE); Tjerk Gauderis, Ghent (BE)

(73) Assignee: BRICSYS NV, Ghent (BE)

( * ) Notice: Subject to any disclaimer, the term of this patent is extended or adjusted under 35 U.S.C. 154(b) by 741 days.

(21) Appl. No.: 16/999,045

(22) Filed: Aug. 20, 2020

(65) Prior Publication Data
US 2021/0056242 A1 Feb. 25, 2021

(30) Foreign Application Priority Data
Aug. 21, 2019 (EP) .................................. 19192952

(51) Int. Cl.
*G06F 30/13* (2020.01)
*G06F 30/12* (2020.01)
(Continued)

(52) U.S. Cl.
CPC .............. *G06F 30/13* (2020.01); *G06F 30/12* (2020.01); *G06F 30/27* (2020.01); *G06F 2111/04* (2020.01)

(58) Field of Classification Search
CPC .......... G06F 30/00; G06F 30/13; G06F 30/12; G06F 30/27; G06F 2111/04; G06F 2111/06; G06F 30/20
(Continued)

(56) References Cited

U.S. PATENT DOCUMENTS

| 7,761,266 B2 | 7/2010 | Mangon et al. |
| 2007/0174026 A1* | 7/2007 | Mangon .................. G06F 30/20 703/1 |

(Continued)

OTHER PUBLICATIONS

Salamak, Marek et al., "Analytical Modeling in Dynamo", Jan. 2018, Section Building Structures & Structural Mechanics, vol. 18, No. 2, Transactions of VSB—Technical university of Ostrava, Civil Engineering Series. (Year: 2018).*

(Continued)

*Primary Examiner* — Cedric Johnson
(74) *Attorney, Agent, or Firm* — Maschoff Brennan

(57) ABSTRACT

A CAD model represents a structure and comprises a plurality of physical elements. For each of multiple physical elements, an analytical element is generated. One or more connection nodes each associated with two or more analytical elements and comprising an initial spatial configuration are generated. At least one analytical element associated with a connection node is not tangent to the connection node. New spatial configurations for all analytical elements and all connection nodes are computed simultaneously to make analytical elements associated with a connection node tangent to said connection node. In an embodiment, the new spatial configurations may be computed simultaneously via optimization of a cost function based on the spatial configurations of the analytical elements and connection nodes. In an embodiment, a representation of the analytical model may be automatically displayed to a user via a GUI.

18 Claims, 7 Drawing Sheets

(51) Int. Cl.
  *G06F 30/27* (2020.01)
  *G06F 111/04* (2020.01)
(58) Field of Classification Search
  USPC .............................................................. 703/1
  See application file for complete search history.

(56) References Cited

U.S. PATENT DOCUMENTS

2015/0372389 A1* 12/2015 Chen ..................... H01Q 3/44
                                                      343/772
2016/0171765 A1   6/2016 Mehr

OTHER PUBLICATIONS

Kaveh, "Graph transformations for efficient structural analysis", Acta Mechanica 229, pp. 659-675 (2018), doi: 10.1007/s00707-017-1991-4, hereafter referred to as Kaveh (2018).

M. Salamak, M. Jasinski, T. Plaszczyk and M. Zarski, "Analytical Modelling in Dynamo", Transactions of the VSB—Technical University of Ostrava, Civil Engineering Series 18(2), pp. 36-43 (2018), doi: 10.31490/tces-2018-0014, hereafter referred to as Salamak (2018).

C. Bron and J. Kerbosch, "Algorithm 457: finding all cliques of an undirected graph", Communications of the ACM 16 (9), pp. 575-577 (1973), doi:10.1145/362342.362367.

R. Tarjan and A. Trojanowski, "Finding a maximum independent set", SIAM Journal on Computing 6(3), pp. 537-546 (1977), doi:10.1137/0206038.

T. Jian, "An O(20.304n) algorithm for solving maximum independent set problem", IEEE Transactions on Computers, IEEE Computer Society 35(9), pp. 847-851 (1986), doi:10.1109/TC.1986.1676847.

J. Robson, "Algorithms for maximum independent sets", Journal of Algorithms 7(3), pp. 425-440 (1986), doi:10.1016/0196-6774(86)90032-5.

N. Megiddo, "Linear-time algorithms for linear programming in R3 and related problems", SIAM Journal on Computing 12(4), pp. 759-776 (1983), doi:10.1137/0212052.

E. Welzl, "Smallest enclosing disks (balls and ellipsoids)", in H. Maurer (editor), New Results and New Trends in Computer Science, Lecture Notes in Computer Science vol. 555, Springer-Verlag, pp. 359-370 (1991), doi:10.1007/BFb0038202.

J. Matoušek, M. Sharir and E. Welzl, "A subexponential bound for linear programming", Algorithmica 16(4-5), pp. 498-516 (1996), doi: 10.1007/BF01940877.

European search report dated Mar. 5, 2020 as received in application No. 19192952.0.

* cited by examiner

COMPUTER-IMPLEMENTED GENERATION OF AN ANALYTICAL MODEL OF A STRUCTURE

FIELD OF THE INVENTION

The present invention pertains to computer-implemented generation of an analytical model (e.g. a wire frame model) of a structure based on a computer aided design (CAD) model representing the structure and comprising a plurality of physical elements, in particular for structural analysis.

BACKGROUND

U.S. Pat. No. 7,761,266 B2 (US 2007/0 174 026 A1) discloses synchronized physical and analytical representations of a CAD model. A CAD model comprises a plurality of physical elements. An analytical representation comprising a plurality of analytical elements corresponding to the physical elements is generated. An association between each analytical element and corresponding physical element is generated such that a modification to one element can be applied to modify a corresponding other. Graphical views of the analytical representation and the physical elements are displayed via a display device.

CAD software is often used to prepare a CAD model representing a structure, such as a building, while in the design stages. The CAD model can include representations of physical elements, such as columns, beams and the like, that will be included in the structure. Drawings prepared from such a CAD model can be used in the actual physical construction of the corresponding structure. The CAD model may be prepared and edited by various individuals, including architects and structural engineers. As part of the design stage, a structural analysis is typically performed on components that will be included in the structure, for example, to ensure there is sufficient load bearing capacity, and the like. Structural analysis software is available to facilitate the analysis process. Conventional structural analysis software receives as input an analytical representation of a structure. An analytical representation of a structure is different than a representation of the physical elements, e.g., columns, beams, etc. It is an idealized mathematical model that may represent only a portion of a building such as one wing or one floor or one frame of the building. For example, an analytical representation may be a wire frame representation of the physical elements, and the wire frame elements can include or be associated with properties (e.g., weight, moment of inertia, cross-sectional area), member connectivity and/or end conditions (e.g., pinned, free, fixed).

Typically, the analytical representation is prepared separately and is used for the structural analysis and perhaps other types of analyses that are performed in the design stage. The analytical representation can be subjected to load simulation and the like in a structural analysis program, for example, to identify stress levels in the various elements. On the basis of the analysis, elements may be modified (e.g., resized or other properties changed) and the modified analytical representation reanalyzed. The results of the analysis can be used to manually update the corresponding physical elements in the CAD model. The effort and coordination involved with maintaining two separate representations of the CAD model (i.e., the physical and the analytical) and maintaining synchronicity between the two can be significant. Synchronization problems not caught before a design is finalized can result in unexpected costs and scheduling problems and safety as the structure may collapse.

U.S. Pat. No. 7,761,266 B2 discloses that an analytical representation can be generated automatically as the user creates or modifies physical elements. An analytical representation can depend on the user's past interaction with the CAD model.

U.S. Pat. No. 7,761,266 B2 discloses predetermined analytical elements and default positions of analytical elements in relation to the corresponding physical element, such as a line (analytical element) running through the center of a column (physical element).

U.S. Pat. No. 7,761,266 B2 discloses automatic connection of analytical elements to one another to form a wire frame representation. As the analytical representation is generated in parallel with the physical representation, connections between physical elements cause connections to be made between analytical elements. In some instances, the location of an analytical element is deviated from the default location so that that the analytical element may connect to another analytical element. In one implementation, connections between analytical elements maintain coherence in the analytical representation. Coherence takes into account the probable location of finite element analysis nodes on analytical elements (e.g., for structural analysis) and guides connections between analytical elements to these locations. A node is a point at which different elements are joined together. Default analytical element locations and coherence requirements can be described by rules or information which can be created and modified by the user or structural analysis.

U.S. Pat. No. 7,761,266 B2 remains silent on an enabling method to determine a deviated location for an analytical element and to create a corresponding node.

M. Salamak, M. Jasinski, T. Plaszczyk and M. Zarski, "Analytical Modelling in Dynamo", *Transactions of the VSB—Technical University of Ostrava, Civil Engineering Series* 18(2), pages 36-43 (2018), doi: 10.31490/tces-2018-0014, hereafter referred to as Salamak (2018), discloses an add-on tool for Autodesk Revit. In Autodesk Revit, a physical model and an analytical model are created simultaneously. The automatic generation of an analytical model is based on internal rules and algorithms of Autodesk Revit, which are not accessible to a user. The user can set in Autodesk Revit a numerical value of a maximum allowable translation of an analytical node from its original location in horizontal and vertical directions. An automatic correction implemented in Autodesk Revit does not always lead to full consistency of the analytical model. Salamak (2018) in particular teaches improved correction of the analytical model based on priority-based repositioning of analytical nodes. If a distance between two disconnected nodes of two different types of objects is less or equal to a tolerance, one of the nodes may be translated to the other node, wherein the choice of which node to move depends on heuristic priorities based on physical element type.

Heuristic priorities may create a heuristic coincidence desire trap. Furthermore, sequential resolution of heuristic coincidence desires may disable a previously identified heuristic coincidence desire. Consider, for example, a middle node positioned centrally in between two flanking nodes. Suppose that the distance between the middle node and each of the two flanking nodes is smaller than said tolerance. Coincidence of the middle node with each of the two flanking nodes is then heuristically desired. The solution may lie in the relative movement of the two flanking nodes towards the middle node. However, suppose that based on heuristic priorities the middle node is to move and the two flanking nodes are of equal priority and are to remain stationary. A first movement of the middle node towards a first flanking node breaks symmetry, which may or may not be allowed, and which may or may not be desired. Such movement may furthermore cause that the distance between the moved middle node and the second flanking node is now larger than the tolerance. Coincidence of the middle node with said second flanking node is then no longer desired according to heuristic rules.

In addition to potentially generating an erroneous analytical model, a heuristic coincidence trap also significantly impedes efficient user editing of an analytical model, as user editing may trigger automatic adjustment of (at least) a part of the analytical model.

Kaveh, "Graph transformations for efficient structural analysis", Acta Mechanica 229, pages 659-675 (2018), doi: 10.1007/s00707-017-1991-4, hereafter referred to as Kaveh (2018), pertains to graph theory and structural analysis. Kaveh (2018) however starts from an analytical model, and remains silent on generating an analytical model from a physical model.

The present invention aims to resolve at least some of the problems and disadvantages mentioned above.

SUMMARY OF THE INVENTION

In a first aspect, the present invention provides a computer-implemented method for generating an analytical model of a structure, according to claim 1.

In a second aspect, the present invention provides a computer system for generating an analytical model of a structure. The computer system is configured for performing the computer-implemented method according to the first aspect.

In a third aspect, the present invention provides a computer program product for generating an analytical model of a structure. The computer program product comprises instructions which, when the computer program product is executed by a computer, cause the computer to carry out the computer-implemented method according to the first aspect.

A connection node may be obtained which is associated with two or more analytical elements, but which does not have to lie on any or all of the analytical elements. The association of the connection node with the two or more elements represents a 'heuristic connection desire' in an analytical node of the two or more analytical elements, and may persist until the heuristic connection desire is met or overruled via heuristic rules. Furthermore, by enabling simultaneous movement of all analytical elements and connection nodes, heuristic coincidence desire traps are avoided.

In an embodiment, each connection node serves as an attractor for the analytical elements associated with it.

In an embodiment, if relative movement of connection nodes and analytical elements effects for each connection node that all analytical elements associated with the connection node are tangent to the connection node, the connection nodes may be marked as analytical nodes. If this is not possible, one or more connection nodes may be modified based on heuristic rules, e.g. splitting of connection nodes, introduction of a rigid link, and the like.

The present invention assists the user in generating an analytical model of a structure by means of a continued and/or guided human-machine interaction process.

DETAILED DESCRIPTION OF THE INVENTION

Figure 1A:
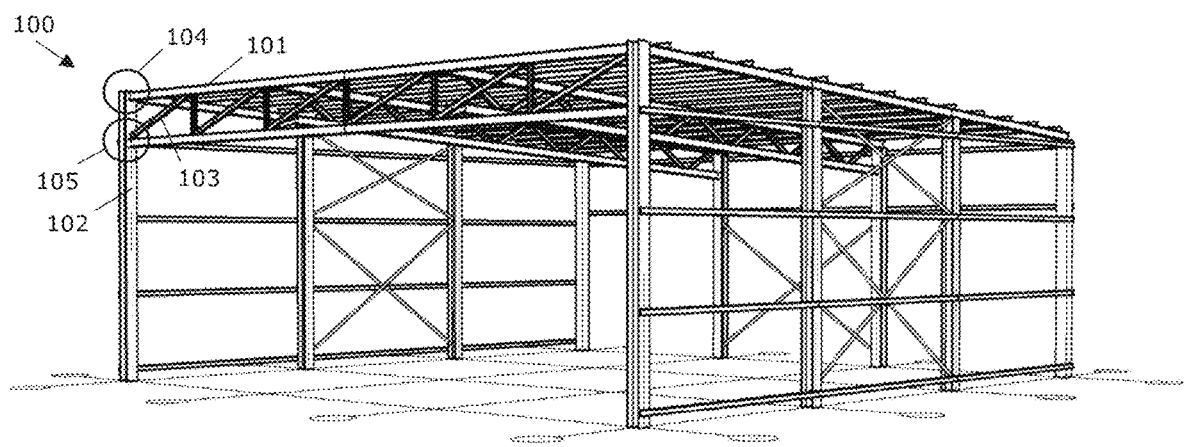
FIG. 1A shows a perspective representation of an exemplary CAD model (100) comprising physical elements (101, 102, 103) and physical connections (104, 105).

The present invention concerns a computer-implemented method (CIM), a computer system, and a computer program product (CPP) for generating an analytical model of a structure. The invention has been summarized in the corresponding section above. In what follows, the invention will be described in detail, preferred embodiments are discussed, and the invention will be illustrated by means of non-limitative examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

Term Definitions

"A", "an", and "the" as used herein refer to both singular and plural referents unless the context clearly dictates otherwise. By way of example, "a compartment" refers to one or more than one compartment.

"Comprise", "comprising", "comprises" and "comprised of" as used herein are synonymous with "include", "including", "includes" or "contain", "containing", "contains" and are inclusive or open-ended terms that specify the presence of what follows (e.g. component) and do not exclude or preclude the presence of additional, non-recited components, features, elements, members, and steps.

"Based on" as used herein is synonymous with "based at least in part on" and is an inclusive or open-ended term that specifies the presence of what follows (e.g. component) and does not exclude or preclude the presence of additional, non-recited components, features, elements, members, and steps.

A "computer-aided design model" (CAD model), as used herein, comprises computer-processable data, preferably digital data, about one or more elements. The data represents, or allows to derive, one or more properties of an element, such as geometric properties, material properties and/or semantic properties. In case the CAD model comprises computer-processable data about multiple elements, the data also represents, or allows to derive, relative geometric properties between elements. The present invention may pertain to various types of CAD models, such as, for example, a building information model (BIM), a computer-aided architectural design (CAAD) model, or a mechanical engineering CAD model. An exemplary file format for storing a CAD model is DWG. One of ordinary skill in the art will appreciate that a CAD model comprises a computer-processable image in vector format, e.g. in DWG file format, defined in terms of low-level features, such as, for example, vertices, edges, and faces.

A CAD model may be viewed and edited via a corresponding CPP, so-called CAD software. CAD software preferably provides a graphical user interface (GUI) for viewing and editing the CAD model. A non-limiting list of examples of CAD software comprises 123D, ACIS, Advance Concrete, Advance Design, Advance Steel, AllyCAD, ArchiCAD, AutoCAD, BricsCAD, BRL-CAD, C3D, Caddie, Cadwork, CATIA, Chief Architect, Cobalt, Creo, DataCAD, DesignSpark Mechanical, Digital Project, Drawing Express, FINE MEP, form·Z, FreeCAD, HiCAD, IDEA Architectural, Inventor, IRONCAD, ItelliCAD, KeyCreator, LibreCAD, MEDUSA, MicroStation, Modelur, NanoCAD, NX, OpenCASCADE, OpenSCAD, Parasolid, PTC Creo, PowerCADD, progeCAD, PunchCAD, QCad, Revit Architecture, Revit MEP, Revit Structure, Rhinoceros 3D, RoutCad, SALOME, ShapeManager, SketchUp, Solid Edge, SolidWorks, SolveSpace, SpaceClaim, SpaceClaim Engineer, Tekla Structures, TopSolid, TransMagic, TurboCAD, VariCAD, VectorWorks, and VisualARQ.

A "physical element", as used herein, refers to a detailed representation of a structural element, such as a beam, a column, a member, a post, a rod or a strut, and comprises a detailed geometric representation. For a beam, for example, the physical element may include a detailed geometric representation of a profile, for example an I-profile, including, for example, a radius of curvature of a fillet.

A "physical connection", as used herein, refers to a detailed representation of a connection between two or more structural elements. Such a connection may itself comprise a mechanical element, such as a joint, a weld, a plate and/or a bolt. Such a connection may additionally or alternatively be based on tangency of corresponding physical elements.

A "physical model", as used herein, refers to a detailed representation of a structure. A physical model comprises physical elements and physical connections. R. C. Hibbeler, Structural Analysis, 9th edition (2015), ISBN 9780133942842, Section 1.1 Introduction, defines a structure as follows: "A structure refers to a system of connected parts used to support a load." A non-limiting list of examples of structures includes a building, a bridge, a tower, a dam, a retaining wall, an offshore structure, a harbor dock, a jetty, a storage tank, a transmission mast, a ship frame, an aircraft frame, and skeletons thereof.

An "analytical element", as used herein, refers to an idealized or abstract mathematical representation of a structural element for use in analysis software. For a beam, for example, the analytical element may be an analytical axis, which is a line segment approximation of the structural element. An analytical element may be determined based on a corresponding physical element. An analytical element comprises a spatial configuration. The spatial configuration of an analytical axis comprises a position and an orientation. The spatial configuration of an analytical axis may be defined based on a first vector indicating a position with respect to an origin and a second vector indicating a direction with respect to the position.

A "rigid link", as used herein, refers to an auxiliary line segment, typically a short auxiliary line segment, connecting two nodes, such as connection or analytical nodes, for use in analysis software, preferably representing an infinitely stiff connection between the two nodes.

A "connection node", as used herein, refers to an idealized or abstract mathematical representation of a connection between two or more analytical elements. The two or more analytical elements are "associated" with the connection node. A connection node comprises a spatial configuration which is a point-like position. An analytical element connected in a connection node may, but need not, be tangent to the connection node, i.e. be tangent to the point-like position, pass through the point-like position, or encompass the point-like position. A connection node serves as an auxiliary node. A connection node may be perceived as expressing a heuristic connection desire. A physical connection may correspond to a connection node or two connection nodes interconnected via a rigid link. In an embodiment, a connection node serves as an attractor for the analytical elements associated with it.

An "analytical node", as used herein, is a connection node for use in analysis software for which all associated analytical elements are tangent to the connection node. A connection node for which all associated analytical elements are tangent to the connection node may be "marked" as an analytical node. If this appears not to be possible, a connection node may be modified based on heuristic rules, e.g. splitting of a connection node into two connection nodes, introduction of a rigid link, and the like.

An "analytical model", as used herein, comprises analytical elements and analytical nodes. The present computer-implemented invention provides for automatic generation of an analytical model based on a CAD model comprising a plurality of physical elements. In a most preferred embodiment, the analytical model is a wire frame model.

A "spatial index" is a data structure that allows for accessing a spatial element efficiently. A particularly preferred spatial index for CAD models is a hierarchical spatial index. A "hierarchical spatial index" comprises intermediary nodes and leaf nodes. A leaf node comprises a pointer to a spatial element and geometric containment information about the spatial element. An intermediary node comprises pointers to one or more nodes (leaf and/or intermediary nodes) and geometric containment information for all spatial elements to which it points. A most preferred hierarchical spatial index for CAD models is an "R-tree", wherein the geometric containment information is a bounding box (e.g. a rectangle or a cuboid).

Aspects of the Present Invention

In a first aspect, the present invention provides a computer-implemented method (CIM) for generating an analytical model of a structure, comprising several steps. In a second aspect, the present invention provides a computer system for generating an analytical model of a structure, whereby the computer system is configured for performing the CIM according to the first aspect. In a third aspect, the present invention provides a computer program product (CPP) for generating an analytical model of a structure, whereby the CPP comprises instructions for performing the CIM according to the first aspect. The CPP in particular comprises instructions which, when the CPP is executed by a computer, such as a computer system according to the second aspect, cause the computer to carry out the CIM according to the first aspect. The third aspect may further also relate to a tangible non-transitory computer-readable data carrier comprising said CPP. The three aspects of the present invention are hence interrelated. Therefore, all features disclosed in this document, above or below, may relate to each of these aspects, even if they have been disclosed in conjunction with a particular aspect.

A computer-aided design (CAD) model represents a structure and comprises a plurality of physical elements. The CAD model may be obtained automatically or via user input.

A user may, for example, create the CAD model via a graphical user interface (GUI). A user may, for example, provide a pointer to a file stored on a tangible non-transitory computer-readable storage medium, wherein the file comprises the CAD model. The CAD model may, for example, be automatically downloaded at a predetermined time from a server.

Based on the CAD model an analytical model comprising analytical elements and analytical nodes is automatically generated. For each of multiple physical elements, an analytical element comprising an initial spatial configuration is generated. A connection node associated with two or more analytical elements is generated. The connection node comprises an initial spatial configuration. At least one analytical element of said two or more analytical elements is not tangent to the connection node. In particular, at their respective initial spatial configurations, at least one analytical element of said two or more analytical elements is not tangent to the connection node. New spatial configurations for each of said two or more analytical elements and said corresponding connection node are computed simultaneously to make each of said two or more analytical elements tangent to said connection node. The analytical model is generated based on said analytical elements and connection nodes.

One of ordinary skill in the art will appreciate that multiple connection nodes may be generated, wherein each connection node comprises an initial spatial configuration, and wherein each connection node is associated with two or more analytical elements. In that case, for at least one connection node of the multiple connection nodes, at least one associated analytical element is not tangent to the connection node. In particular, at their respective initial spatial configurations, for at least one connection node of the multiple connection nodes, at least one associated analytical element is not tangent to the connection node. In that case, new spatial configurations for all analytical elements and all connection nodes are computed simultaneously to make each analytical element tangent associated with a connection node tangent to said connection node.

One of ordinary skill in the art will further appreciate that, once achieved, tangency of an analytical element to an associated connection node, is most preferably retained, e.g. during further computation. As explained further below, connection nodes for which all associated analytical elements are tangent thereto, may, for example, be merged.

One of ordinary skill in the art will also appreciate that the computation of new spatial configurations for connection nodes and analytical elements may, as a result of the computation which allows spatial configurations to change simultaneously, yield for a connection node and/or an analytical element a new spatial configuration which is numerically identical to the old spatial configuration. 'New' hereby refers to the computation yielding a spatial configuration, which may be numerically identical to or may numerically differ from the previous spatial configuration.

A representation of the analytical model may be automatically displayed via a visualization means and/or GUI. The analytical model may be stored automatically or via user input on a tangible non-transitory computer-readable storage medium. An automatic computer-implemented analysis based on the analytical model may be started automatically or via user input.

A displayed representation of the analytical model may comprise representations of the analytical elements of the analytical model in spatial proximity of, and most preferably overlaid over, the corresponding physical elements.

A user may, for example, press a save button via a GUI, select a folder via a GUI, and enter a filename via keyboard, for storage of the analytical model in said folder under said filename. The analytical model may, for example, be automatically stored in the same folder where the CAD model is stored, under a filename automatically derived from the filename associated with the CAD model. The analytical model may, for example, be added to the CAD model, and the CAD model comprising the analytical model may be automatically stored. A user may, for example, press an analysis button via a GUI to start the computer-implemented analysis. The computer-implemented analysis may be performed via analysis software. After generation of the analytical model, an automated call to analysis software may be performed, wherein the call comprises a reference to the stored analytical model, such as, for example, the CAD model comprising the analytical model.

A non-limiting list of examples of analysis comprises structural analysis, concrete design analysis, lateral load analysis, gravity load analysis, beam design analysis, steel design analysis, dynamic analysis, seismic analysis and steel connection design analysis. Most preferably, the analysis is structural analysis.

In a preferred embodiment, multiple connection nodes are generated. Each connection node is associated with two or more analytical elements. Each connection node comprises an initial spatial configuration. At least one of the analytical elements associated with a connection node is not tangent to the connection node. For at least one connection node of the multiple connection nodes, at least one of the associated analytical elements is not tangent to the connection node. New spatial configurations for all analytical elements and all connection nodes are computed simultaneously to make analytical elements associated with a connection node tangent to said connection node.

A connection node may be obtained which is associated with two or more analytical elements, but which does not have to lie on any or all of the analytical elements. The association of the connection node with the two or more elements represents a 'heuristic connection desire' in an analytical node of the two or more analytical elements, and may persist until the heuristic connection desire is met or overruled via heuristic rules. Furthermore, by enabling simultaneous movement of all analytical elements and connection nodes, heuristic coincidence desire traps are avoided.

A pair of connection nodes may be merged to a new connection node. In a preferred embodiment, a pair of connection nodes comprising a relative distance satisfying a relative distance criterion is searched for. Whether the analytical elements associated with at least one of the connection nodes of the pair satisfy a compactness criterion is verified. In case the compactness criterion is satisfied, the pair of connection nodes is merged to a new connection node.

A connection node may be split into two new connection nodes. The connection node may be split along an analytical element tangent to the connection node, in which case the analytical element is tangent to each connection node of the two new connection nodes. The connection node may be split into two new connection nodes interconnected via a rigid link.

Via the GUI one or more changes of the analytical model may be obtained from the user. Each time a user change of the analytical model is obtained, an automatic computation of new spatial configurations may be performed for at least some of the analytical elements and connection nodes of the analytical model. The displayed representation may be updated accordingly. A change may comprise a restriction or relaxation on one or more analytical elements and/or a merging or splitting of one or more connection nodes. A change may comprise a restriction or relaxation on parallelism, absolute or relative distances, and/or absolute or relative angles between an analytical element an a corresponding physical element. A change may comprise a restricting or relaxation on containment of an analytical element within a directed bounding box enclosing a corresponding physical element. A change may comprise a merging of two or more connection nodes into a new connection node. A change may comprise a splitting of a connection node into two or more new connection nodes. In addition to said automatic computation of new spatial configurations for at least some of the analytical elements upon obtaining a user change of the analytical model, user input may be obtained which effects computation of new spatial configurations for all analytical elements and all connection nodes.

Wire Frame Model

A structural element may be an elongated structural element. A physical element may be an elongated physical element representing an elongated structural element. A non-limiting list of examples of elongated structural elements comprises a beam, a column, a member, a post, a rod, and a strut. For an elongated physical element, the analytical element is preferably an analytical axis.

A structural element may be a planar structural element, such as a wall or a slab. A physical element may be a planar physical element representing a planar structural element. An analytical element may comprise multiple analytical axes. An analytical element corresponding to a planar physical element may be a planar polygonal (e.g. triangle or quadrilateral) representation, comprising multiple analytical axes corresponding to the edges of the polygons. Two or more analytical axes may be associated with a connection node. One or more analytical axes and a planar polygonal may be associated with a connection node. In that case, tangency of the analytical axes and of the planar polygonal to the connection node is desired. Two planar polygonals may be associated with a connection line. A connection line is the corresponding one-dimensional equivalent of a zero-dimensional connection node. In that case, tangency of the two planar polygonals to the connection line is desired. The present invention therefore does not have to be limited to only analytical axes and connection nodes.

In a most preferred embodiment, the analytical model is a wire frame model. For each of multiple physical elements, an analytical element comprising an initial spatial configuration is generated. The analytical element may be an analytical axis or may comprise multiple analytical axes. For each of multiple physical elements, an analytical axis comprising an initial spatial configuration comprising a position and an orientation is generated. For each of multiple physical elements, at least one analytical axis comprising an initial spatial configuration comprising a position and an orientation is generated. In an embodiment, for one or more physical elements, multiple analytical axes each comprising an initial spatial configuration comprising a position and an orientation may be generated.

FIG. 1A shows a perspective representation of an exemplary CAD model (100), in particular of a steel structure, comprising physical elements (101, 102, 103), in particular elongated physical elements such as a column (102), a beam (101) and a member (103), and physical connections (104, 105), for example involving plates, bolts and/or welds.

Figure 1B:
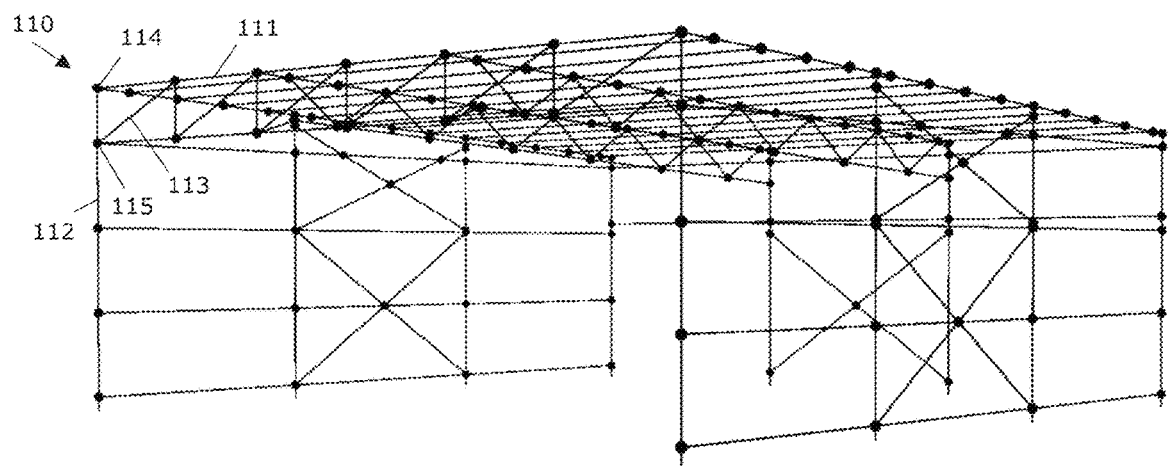
FIG. 1B shows a perspective representation of an exemplary analytical model (110), corresponding with the CAD model of FIG. 1A, and comprising analytical elements (111, 112, 113) and analytical nodes (114, 115).

FIG. 1B shows a perspective representation of an exemplary analytical model (110), corresponding with the CAD model (100) of FIG. 1A, which comprises analytical elements (111, 112, 113), in particular analytical axes, and analytical nodes (114, 115). Analytical axes 111, 112 and 113 correspond with beam 101, column 102 and member 103, respectively. Analytical nodes 114 and 115 correspond with physical connections 104 and 105, respectively.

Figure 2A:
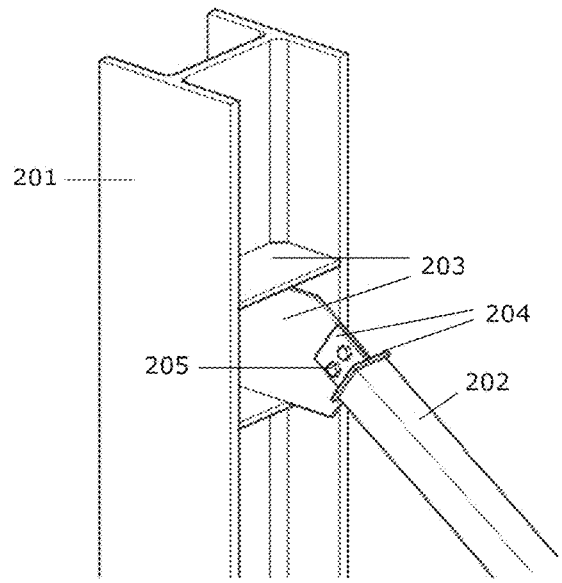
FIGS. 2A, 2B, 3, 4, 7A, 7B, 8A, 8B, 9A, 9B, 10A and 10B show perspective representations of exemplary physical elements and/or exemplary analytical elements to illustrate embodiments of algorithms according to the present invention.
Figure 2B:
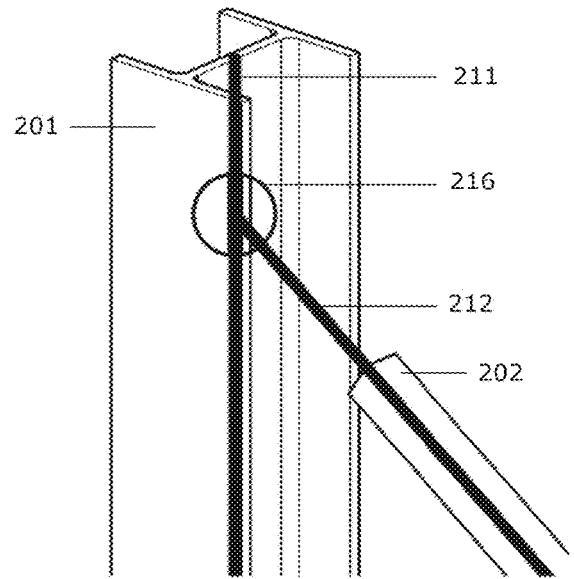

FIG. 2A shows a perspective representation of an exemplary CAD model comprising elongated physical elements, in particular a column (201) and a member (202). The physical elements are connected via a physical connection (203, 204, 205) involving plates, bolts and welds. FIG. 2B shows a perspective representation of the physical elements of FIG. 2A, as well as analytical axis 211 corresponding with the column (201) and analytical axis 212 corresponding with the member (202). The analytical axes are connected in an analytical node (216).

Cost Function

In a preferred embodiment, the new spatial configurations are computed via optimization of a cost function. The cost function is based on spatial configurations of each of said two or more analytical elements and said corresponding connection node. Preferably, the cost function is based on spatial configurations of all analytical elements and all connection nodes. Preferably, the optimization is a constrained optimization. Preferably, the optimization is based on partial constraints for one, multiple or all of the spatial configurations.

A first type of constraint may pertain to one or more relative geometric properties between analytical elements. The first type of constraint may be relevant for physical elements for which multiple analytical axes are generated, such as a polygonal representation for a planar physical element, whereby relative angles and/or relative distances between several analytical axes of the physical element are constrained.

A second type of constraint may pertain to one or more geometric properties of an analytical element. For example, for a beam comprising a profile, a single analytical axis at the center of the beam profile and with a length equal to the length of the beam profile may be generated. One or more constraints on the length of the analytical axis may be imposed. One or more constraints on the position of the analytical axis may be imposed. One or more constraints on the angle of the analytical axis may be imposed. For example, a bounding box for the beam profile may be computed or obtained from the CAD model, whereby the analytical axis is constrained to be positioned within the bounding box. For example, the analytical axis may be constrained to remain parallel to a longitudinal inertial axis of the beam profile, or to comprise an angle with said longitudinal inertial axis lower than or equal to an upper bound. For example, the analytical axis may be constrained to comprise a length within fractional lower and upper bounds of the length of the beam profile, e.g. of from 85% to 115% of the length of the beam profile.

A third type of constraint may pertain to one or more relative geometric properties between connection nodes.

The third type of constraint may be relevant for auxiliary rigid links in between two connection nodes, corresponding with a relative distance constraint in between the two connection nodes.

A fourth type of constraint may pertain to one or more geometric properties of a connection node. For example, the position of a connection node may be constrained to a cube with predefined side length, or a sphere with predefined diameter, centered around the position of the initial spatial configuration.

Preferably, the cost function is a positive semi-definite cost function. Preferably, the optimization is minimization. Preferably, the cost function is based on a relative distance of an analytical element of said two or more analytical elements and said corresponding connection node. Preferably, the cost function is based on relative distances of connection nodes and therewith associated analytical axes.

Said automatic computation of new spatial configurations for at least some of the analytical elements upon obtaining a user change of the analytical model may also be based on constrained optimization, in particular in which absolute or relative spatial configurations of one or more analytical elements and/or connection nodes of the analytical model are kept fixed.

In a preferred embodiment, the cost function comprises a sum of, for each association of a connection node and an analytical element, a positive semi-definite term based on a relative distance. Preferably, the value of the term is zero when the analytical element is tangent to the connection node and larger than zero when the analytical element is not tangent to the connection node.

A term based on a relative distance may be based on the square of the distance of the connection node to the associated analytical element.

A term based on a relative distance may be based on the square of a surface area of a parallelogram defined by:
 a first edge or vector from a first point on the analytical element, preferably analytical axis, to the connection node; and
 a second edge or vector from the first point to a second point, different from the first point, on the analytical element, preferably analytical axis.

In these cases, the value of the term is zero when the analytical element is tangent to the connection node and larger than zero when the analytical element is not tangent to the connection node.

A connection node then serves, via the cost function, as an attractor for an analytical element associated with it. Minimization of the cost function then corresponds to making analytical elements tangent to their corresponding connection nodes.

In a preferred embodiment, the constrained optimization is based on an active set method comprising for each of the spatial constraints a state, wherein an unbounded conjugate gradient method with line search is utilized for optimization associated with a state of the active set.

Optimization of a cost function is particularly advantageous in case no full solution can be computed. For the above-mentioned positive semi-definite cost function, this is the case when the cost function cannot be made equal to zero. An approximate solution is nonetheless retrieved, comprising approximate spatial configurations. Based on the approximate spatial configurations, certain constraints can be selected and removed, based on heuristic rules.

Furthermore, each term can be a weighted term, comprising a weight. Weights influence which approximate solution is obtained. A smaller weight typically results in an analytical axis which is further away from the corresponding connection node.

A preferential exemplary cost function is disclosed in example 2 below.

Clique Retrieval from a Connection Graph

A connection node may be generated via clique retrieval from a connection graph.

A graph comprises graph nodes and edges. A clique is a set of two or more completely interconnected graph nodes, i.e. each pair of graph nodes of the clique is interconnected via an edge. A maximal clique is a clique which cannot be enlarged by addition of another graph node.

In a preferred embodiment, a connection graph is constructed. The connection graph comprises graph nodes and edges. A graph node represents an analytical element. An edge interconnects two graph nodes in case a relative distance of the corresponding analytical elements satisfies a relative distance criterion. From the connection graph, a clique is retrieved for which the corresponding analytical elements satisfy a compactness criterion. The connection node is generated based on said clique. The connection node is associated with the analytical elements represented by the graph nodes of the clique.

A preferred example of the relative distance criterion pertains to a minimal relative distance in between the analytical elements being smaller than, or being smaller than or equal to, a predefined distance threshold. Preferably, a minimal distance between a pair of analytical elements is associated with a minimal distance point on each of the analytical elements of the pair.

Preferably, the compactness criterion is based on a region of limited spatial extent in which each pair of analytical elements associated with graph nodes of the clique satisfies the relative distance criterion. Preferably, the region is a sphere. Preferably, the compactness criterion is based on said region comprising the minimal distance points for all pairs of analytical elements represented by graph nodes of the clique.

In a preferred embodiment, the connection node is generated based on a maximal clique in the connection graph for which the corresponding analytical elements satisfy the compactness criterion.

Figure 5A:
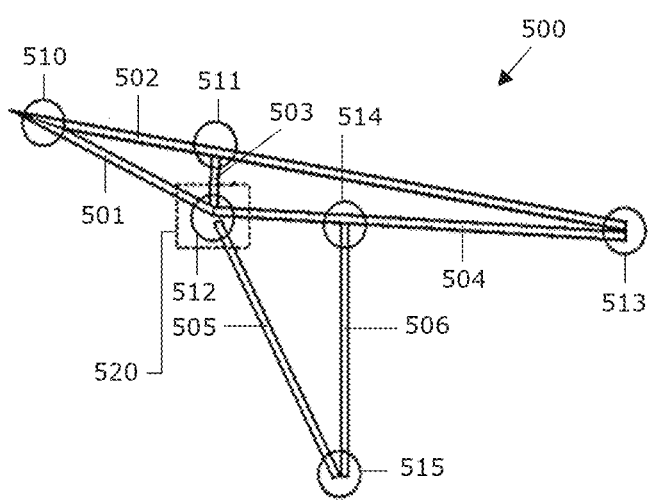
FIG. 5A shows a schematic representation of an exemplary CAD model comprising physical elements.

FIG. 5A shows a schematic representation of an exemplary CAD model (500) comprising a plurality of physical elements (501, 502, 503, 504, 505, 506), in particular elongated physical elements representing beams, columns and/or members. The circles in FIG. 5A indicate locations (510, 511, 512, 513, 514, 515) where at least two of the analytical elements corresponding with the physical elements satisfy the relative distance criterion.

Figure 5B:
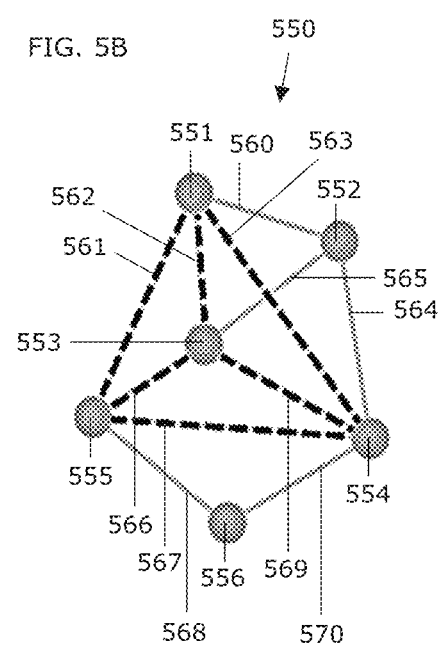
FIG. 5B shows a schematic representation of an exemplary connection graph, corresponding with the CAD model of FIG. 5A.

FIG. 5B shows a schematic representation of an exemplary connection graph (550) corresponding with the exemplary CAD model (500) of FIG. 5A. The connection graph comprises graph nodes (551, 552, 553, 554, 555, 556) and edges (560, 561, 562, 563, 564, 565, 566, 567, 568, 569, 570). Graph nodes 551, 552, 553, 554, 555 and 556 represent analytical elements corresponding with, respectively, physical elements 501, 502, 503, 504, 505 and 506. The connection graph comprises for each pair of graph nodes for which the associated analytical elements satisfy the relative distance criterion an edge.

Graph nodes 551, 553, 554 and 555 form a first clique of size 4, indicated by dashed edges 561, 562, 563, 566, 567 and 569 in FIG. 5B. Graph nodes 551, 552, 553, 554 form a second clique of size 4. The analytical elements associated with the graph nodes of the first clique are pairwise proximate within a common region 512 of limited spatial extent, additionally indicated by the dashed box 520. These analytical elements satisfy the compactness criterion. For the analytical elements associated with the graph nodes of the second clique, no such common region with sufficiently limited extent can be identified. These analytical elements do not satisfy the compactness criterion.

In a preferred embodiment, all maximal cliques for which the corresponding analytical elements satisfy the compactness criterion are recursively retrieved. For each maximal clique, a connection node based on said maximal clique is generated.

Preferably, all maximal cliques for which the corresponding analytical elements satisfy the compactness criterion are recursively retrieved based on a maximal clique retrieval algorithm with an additional filter based on the compactness criterion.

Embodiments of maximal clique retrieval algorithms are disclosed in:

C. Bron and J. Kerbosch, "Algorithm 457: finding all cliques of an undirected graph", *Communications of the ACM* 16(9), pages 575-577 (1973), doi:10.1145/362342.362367;

R. Tarjan and A. Trojanowski, "Finding a maximum independent set", *SIAM Journal on Computing* 6(3), pages 537-546 (1977), doi:10.1137/0206038

T. Jian, "An $O(2^{0.304n})$ algorithm for solving maximum independent set problem", *IEEE Transactions on Computers, IEEE Computer Society* 35(9), pages 847-851 (1986), doi:10.1109/TC.1986.1676847

J. Robson, "Algorithms for maximum independent sets", *Journal of Algorithms* 7(3), pages 425-440 (1986), doi: 10.1016/0196-6774(86)90032-5

Most preferably, the maximal clique retrieval algorithm is the Bron-Kerbosch algorithm.

Compactness Criterion

In a preferred embodiment, the relative distance between a pair of analytical elements is associated with a minimal distance point on each of the analytical elements of the pair.

In a preferred embodiment, verification of a compactness criterion for a multiple analytical elements is based on:
  constructing a sphere encompassing all minimal distance points associated with relative distances in between pairs of analytical elements of said multiple analytical elements; and
  verifying whether a size of the sphere satisfies a size criterion.

In a preferred embodiment, the sphere is a minimally enclosing sphere. Preferably, the sphere is constructed based on the Megiddo algorithm, the Welzl algorithm, or the Matoušek-Sharir-Welzl algorithm. Embodiments of these algorithms are disclosed in respectively:

N. Megiddo, "Linear-time algorithms for linear programming in $R^3$ and related problems", *SIAM Journal on Computing* 12(4), pages 759-776 (1983), doi:10.1137/0212052;

E. Welzl, "Smallest enclosing disks (balls and ellipsoids)", in H. Maurer (editor), New Results and New Trends in Computer Science, Lecture Notes in Computer Science Vol. 555, Springer-Verlag, pages 359-370 (1991), doi: 10.1007/BFb0038202; and J. Matoušek, M. Sharir and E. Welzl, "A subexponential bound for linear programming", *Algorithmica* 16(4-5), pages 498-516 (1996), doi: 10.1007/BF01940877.

Most preferably, the sphere is constructed based on the Welzl algorithm.

A particular example of multiple analytical elements are the analytical elements corresponding with a clique. In that case, the sphere encompasses all minimal distance points associated with edges in between graph nodes of the clique. The connection node generated based on the clique preferably comprises an initial spatial configuration coinciding with the center of the sphere.

The invention is further described by the following non-limiting examples which further illustrate the invention, and are not intended to, nor should they be interpreted to, limit the scope of the invention.

EXAMPLES

Example 1: Embodiment of the Present Invention

This example pertains to a preferred embodiment of the present invention. In this embodiment, the CIM comprises the steps of:

a. generating for each of multiple physical elements an analytical axis comprising an initial spatial configuration comprising a position and an orientation;

b. computing for each pair of analytical axes a relative distance, wherein the relative distance is associated with a minimal distance point on each of the analytical axes of the pair;

c. constructing a connection graph comprising graph nodes and edges, wherein a graph node represents an analytical axis, wherein an edge interconnects two graph nodes in case a relative distance of the corresponding analytical axes satisfies a relative distance criterion;

d. recursively obtaining all maximal cliques for which the corresponding analytical elements satisfy a compactness criterion, wherein a clique is a set of two or more completely interconnected graph nodes, wherein a maximal clique is a clique which cannot be enlarged by addition of another graph node, wherein verification of the compactness criterion for analytical elements corresponding with a clique comprises:
  construction of a minimally enclosing sphere encompassing all minimal distance points associated with edges in between graph nodes of the clique; and
  verification whether a size of the minimally enclosing sphere satisfies a size criterion;

e. generating for each obtained maximal clique a connection node associated with the analytical elements represented by the graph nodes of the maximal clique, wherein the connection node comprises an initial spatial configuration comprising a position coinciding with the center of the minimally enclosing sphere of the maximal clique, wherein at least one of the analytical axes associated with a connection node is not tangent to the connection node;

f. optionally, merging two connection nodes to a new connection node;

g. optionally, splitting a connection node into two new connection nodes;

h. computing simultaneously new spatial configurations for all analytical axes and all connection nodes, most preferably via optimization of a cost function based on the spatial configurations of the analytical axes and connection nodes, to make analytical axes associated with a connection node tangent to said connection node, preferably wherein the new spatial configurations are computed via constrained minimization of a positive semi-definite cost function, preferably wherein said constrained minimization is based on spatial constraints for one, multiple or all of the spatial configurations;
i. preferably, automatically displaying to a user via a GUI a representation of the wire-frame model; and
j. preferably obtaining from the user via the GUI one or more changes of the wire-frame model, preferably wherein each time a user change of the wire-frame model is obtained, an automatic computation of new spatial configurations us performed for at least some of the analytical elements and connection nodes of the analytical model, preferably wherein the displayed representation is updated accordingly.

Example 2: Embodiment of a Cost Function

This example pertains to a preferred embodiment of a cost function. The cost function of this example may be used in conjunction with example 1.

Each node n of a set N of connection nodes is parametrized by Cartesian coordinates which are variables of the cost function: $\bar{p}_n=(x_n,y_n,z_n)$.

Each analytical axis is comprised in either one of:
a set $A_{NR}$ of non-relaxed axes; and
a set $A_R$ of relaxed axes.

Each connection node n is associated with a set of analytical axes $A_n$, part of the union of $A_{NR}$ and $A_R$, that should pass through the connection node. Vice versa, each analytical axis i is associated with a set of connection nodes $N_i$.

Each non-relaxed analytical axis i in $A_{NR}$ is characterized by a fixed root point $\bar{p}_i$, a fixed direction $\hat{d}_i$, two fixed offset directions $\hat{u}_i$ and $\hat{v}_i$, perpendicular to $\hat{d}_i$, and two offset scalar variables $u_i$ and $v_i$. The equation for non-relaxed analytical axis i is:

$$\bar{p}_i(t)=\bar{p}_i+u_i\hat{u}_i+v_i\hat{v}_i+t\hat{d}_i.$$

Herein, t denotes a scalar which parametrizes a point $\bar{p}_i(t)$ on non-relaxed analytical axis i.

Each relaxed analytical axis j in $A_R$ is characterized by two nodes $s_j \in N$ and $e_j \in N$. $E_j=\{s_j, e_j\}$ denotes the set of defining nodes of relaxed analytical axis j. The equation for relaxed analytical axis j is:

$$\bar{p}_j(t)=(1-t)\bar{p}_{s_j}+t\bar{p}_{e_j}.$$

Herein, t denotes a scalar which parametrizes a point $\bar{p}_j(t)$ on relaxed analytical axis j. The variables associated with a relaxed analytical axis are the coordinates of its defining nodes.

The problem to solve is finding values for all variables $x=\{x_n, y_n, z_n, u_i, v_i | n \in N, i \in A_{NR}\}$ so that all $\bar{p}_n$ are on all therewith associated analytical axes in $A_n$, and where bound constraints for all variables are satisfied:

$$x_n^{min} \leq x_n \leq x_n^{max};$$

$$y_n^{min} \leq y_n \leq y_n^{max};$$

$$z_n^{min} \leq z_n \leq z_n^{max};$$

$$u_i^{min} \leq u_i \leq u_i^{max};$$

$$v_i^{min} \leq v_i \leq v_i^{max}.$$

A positive semi-definite cost function is utilized which is a sum of weighted terms. The following positive semi-definite cost function F is most preferably utilized:

$$F(x) = \sum_{n \in N} \left( \sum_{i \in A_n \cap A_{NR}} w_i \|\bar{\Delta}_i(\bar{p}_n, u_i, v_i)\|^2 + \sum_{j \in A_n \cap A_R, n \notin E_j} w_j \|\Xi_j(\bar{p}_n, \bar{p}_{s_j}, \bar{p}_{e_j})\|^2 \right)$$

Herein, $\bar{\Delta}_i(\bar{p}_n, u_i, v_i)$ is a vector from connection node n to the closest point on non-relaxed analytical axis i.

Herein, $\Xi_j(\bar{p}_n, \bar{p}_{s_j}, \bar{p}_{e_j})$ is a vector associated with connection node n and relaxed analytical axis j:

$$\Xi_j(\bar{p}_n, \bar{p}_{s_j}, \bar{p}_{e_j}) = \frac{1}{L_j^0}(\bar{p}_n - \bar{p}_{s_j}) \times (\bar{p}_{e_j} - \bar{p}_{s_j})$$

in which $L_j^0 = \|\bar{p}_{e_j}^0 - \bar{p}_{s_j}^0\|$ is the distance between the defining nodes of relaxed analytical axis j at their initial configuration. The vector $\Xi_j(p_n, p_{s_j}, p_{e_j})$ corresponds to a parallelogram defined by:
a first vector $\bar{p}_n - \bar{p}_{s_j}$ from defining node $s_j$ on analytical axis j to connection node n; and
a second vector $\bar{p}_{e_j} - \bar{p}_{s_j}$ from defining node $s_j$ on analytical axis j to defining node $e_j$ on analytical axis j.

The vector is perpendicular to the parallelogram, and comprises a length equal to the surface area of the parallelogram, normalized with $L_j^0$. The normalization $L_j^0$ ensures that each term in the cost function F(x) scales as a distance squared.

If the bounds on the variables allow this cost function to be minimized to zero, a (not necessarily unique) full solution is found. If the cost function cannot be minimized to zero, an approximate solution may still be found. In the latter case, some constraints need to be relaxed in order to find a full solution. Minimizing the cost function can be performed using a gradient-based local optimization strategy, such as a conjugate gradient method with line search.

The cost function can be expressed analytically in terms of the variables x. At a current approximate solution $x_c$, the gradient $g_c$ of the cost function with respect to the variables can be computed, preferably based on an analytical expression for the gradient. A line search from the current approximate solution $x_c$ in the direction of the gradient $g_c$ can be performed:

$$x(\beta)=x_c+\beta g_c$$

$$F(x(\beta))=F(\beta)=a\beta^4+b\beta^3+c\beta^2+c\beta+F(0).$$

A minimum of the cost function in the direction of the gradient can be computed based on the roots of the derivative of $F(\beta)$ with respect to $\beta$. Analytical expressions for the roots can be obtained.

Example 3: Embodiment According to the Present Invention

This example pertains to a preferred embodiment according to the present invention. This example pertains to each of examples 1 and 2.

In the construction of a wire frame model, analytical axes at or close to the center of a physical element are preferably utilized. At the same time, preferably, as few analytical nodes and rigid links as possible are utilized. These considerations pose a trade-off.

1. Candidate Connection Nodes

First, possible locations for connection nodes are retrieved. Since connection nodes represent connections between physical elements, locations in the model are retrieved where physical elements come close together. This is done based on the center axes of the physical elements. Since these center axes often do not all intersect in the same point in realistic physical connections (see description of FIG. 3 below), a connection node is not necessarily (initially) an intersection point (analytical node). A connection node is associated with a node sphere and links to the physical elements it connects. The diameter of the node sphere is a measure of the distance allowed between physical elements to still consider them connected.

Figure 3:
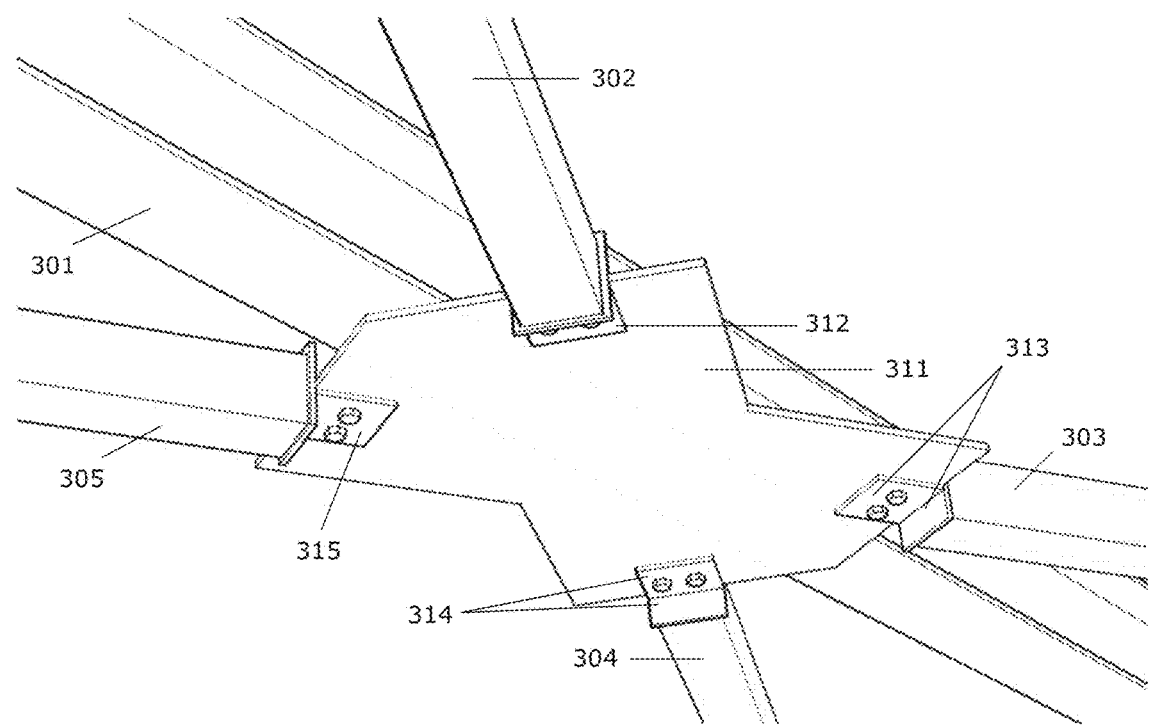

FIG. 3 shows a perspective view of an embodiment of a CAD model comprising a beam (301) and four members (302, 303, 304, 305). A physical connection connects the beam and members. The physical connection involves a plate (311) welded to the beam (301) and connection elements (312, 313, 314, 315) connected via bolts to the plate (311) and partially inserted in and/or welded to the members (302, 303, 304, 305). The center axes (inertial axes, not indicated) of the members (302, 303, 304, 305) lie in essence in the plane of the plate (311), which lies (according to the perspective view shown in FIG. 3) below the center axis (inertial axis, not indicated) of the beam (301).

To construct a candidate connection node from a set of physical elements, minimal distance points for all pairs of elements in the set are considered. A minimal distance point of an element with respect to another element is the point on its center axis that is closest to the center axis of the other element. From the collection of all minimal distance points of the set, a node sphere is constructed by using the Welzl algorithm for finding a minimally enclosing sphere. If this sphere has a diameter not larger than a predefined maximal diameter, the center of the sphere is utilized for generating the connection node. If this condition is not satisfied, no valid connection node can be constructed from the supplied set of physical elements.

Figure 4:
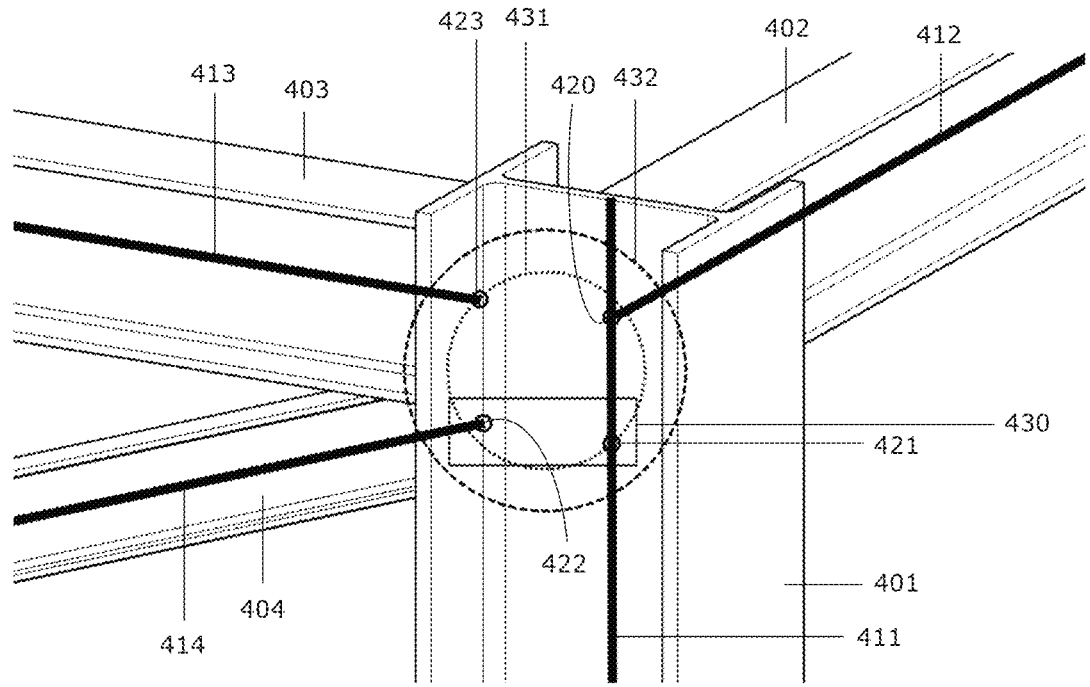

FIG. 4 shows a perspective view of an embodiment of a CAD model comprising a column (401), a first beam (402), a second beam (403) and a member (404), which are connected at or near an outer end of the column. Center axes 411, 412, 413 and 414, or analytical axes at an initial spatial configuration coinciding with the center of the elongated physical elements, of respectively the column (401), the first beam (402), the second beam (403) and the member (404) are shown as well. Minimal distance points (420, 421, 422, 423) for each pair of center axes are obtained, and corresponding minimal distances for each pair of center axes are calculated. In the present case, shown in FIG. 4, all minimal distance points for a center axis coincide, i.e. there is one point on each center axis most proximate to all other center axes. (This does not have to be the case, as may be observed from FIG. 5, wherein for elements 501 and 502 minimal distance points at or near location 510 are obtained and for elements 502 and 504 minimal distance points at or near location 513.) For example, the center axes of the member (404) and the column (401) are most proximate in the region indicated by rectangle 430, in particular at the respective minimal distance points 422 and 421. The small dotted sphere 431 represents the minimally enclosing sphere obtained via the Welzl algorithm. The connection node comprises an initial position at the center of the minimally enclosing sphere. The larger dashed sphere 432 represents the node sphere associated with the connection node, comprising said predefined maximal diameter.

An initial node diameter, i.e. the predefined maximal diameter, may be determined based on a simple heuristic which takes the maximum of a predefined typical node size and the largest cross-sectional profile dimension in the model.

To retrieve candidate connection nodes, a connection graph is constructed, in which each vertex (graph node) corresponds to a physical element and in which two vertices are connected by an edge if the center axes of the corresponding two physical elements are closer to each other than the initial node diameter, i.e. the predefined maximal diameter. The search for connections is optimized using spatial indexing of the candidate solids in 3D space via an R-tree.

From the connection graph, candidate connection nodes are identified by looking for maximal cliques in the graph, using the Bron-Kerbosch algorithm with an additional filter based on the compactness criterion. The compactness criterion for finding connection nodes is that a valid node can be constructed with the initial node diameter from the set of physical elements corresponding to the clique. See also FIGS. 5A and 5B and the corresponding parts of the detailed description.

After finding the candidate nodes, post-processing may be performed for the following two reasons:
  An end of a physical element (end of an analytical axis) can be contained in only one connection node.
  The initial node diameter has been determined based on a simple heuristic. Some robustness against variations in this choice may be built in. Overlapping candidate nodes, i.e. with overlapping node spheres, may be merged. A new node from the union set of physical elements from both source nodes may be constructed. Generally, the larger the nodes become (i.e. the more physical elements they connect), the more difficult it is to find a single intersection point for all associate analytical axes. As described below, a node may also be split when needed.

For this post-processing, all nodes are collected in a new spatial index (R-tree) and all overlaps between node spheres are searched. It may be attempted to merge two nodes. If this does not work, it is checked whether the overlapping nodes are conflicting, i.e. share the same ends of some physical elements. In the latter case, the conflict is resolved by assigning each of the conflicting elements to one of the nodes. A heuristic is used based on the minimal distance to non-shared elements. The post-processing of overlapping nodes continues, also including the newly constructed merges nodes, until no more changes can be made.

2. Core Solver

The core solver tries to find final locations for the identified connection nodes and analytical axes, such that all analytical axes associated to the same connection node, pass through the connection node center (i.e. are tangent to the connection node position). This problem is reformulated as an optimization problem in which a positive semi-definite cost function must be minimized to zero, see example 2. The constraints are initially as follows:
  The position of each connection node should stay in a cube with side equal to the node sphere diameter, centered on the initial position of the node sphere.
  Each axis should stay parallel to the center axis of the corresponding physical element and within the bounds of the profile in both profile directions.

Figure 6:
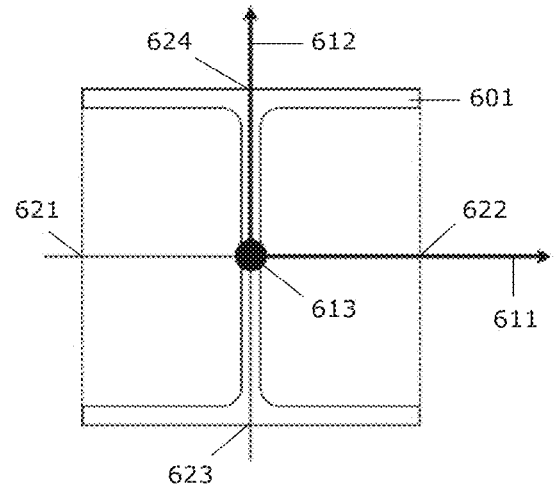
FIGS. 6, 11A, 11B, 11C, 11D and 12 show a cross-section representation of an exemplary physical element to illustrate embodiments of algorithms according to the present invention.

FIG. 6 shows a cross-sectional view of an embodiment of a profile (601) and an analytical axis (613) coinciding with the center axis of the profile. The analytical axis should stay parallel to the center axis. The analytical axis should stay within bounds of the profile in both profile directions. Along a first cross-section axis (611), the U-axis, the corresponding coordinate u of the analytical axis should stay in between a minimal bound (621) and a maximal bound (622): $u^{min} \leq u \leq u^{max}$. Along a second cross-section axis (612), the V-axis, the corresponding coordinate v of the analytical axis should stay in between a minimal bound (623) and a maximal bound (624): $v^{min} \leq v \leq v^{max}$.

The optimization algorithm which is used to solve this constrained minimization problem is an active set approach that uses an unbounded conjugate gradient method with line search to solve the sub problem for each state of the active set.

The advantage of utilizing an optimization of a cost function is that, if no full solution can be obtained, at least an approximate solution is obtained. This provides information about how the problem may be relaxed to allow for a full solution (see relaxation strategy below). The approximate solution can be influenced via choice of the weights $w_i$. Axes with smaller weights in the cost function will be further away from their nodes than axes with larger weights. So larger weights are associated with axes which should preferably be positioned near the center axis of the physical element. In practice, these are axes corresponding to physical elements that have heavy profiles and are aligned with the main directions of the model (vertical and horizontal main directions). Smaller weights are associated with axes corresponding with small profiles and/or large angles with respect to the main directions.

3. Relaxation Strategy

In case no full solution is obtained, relaxations to the model are introduced and a new solve is conducted. These iterations are continued until a full solution is found.

Figure 7A:
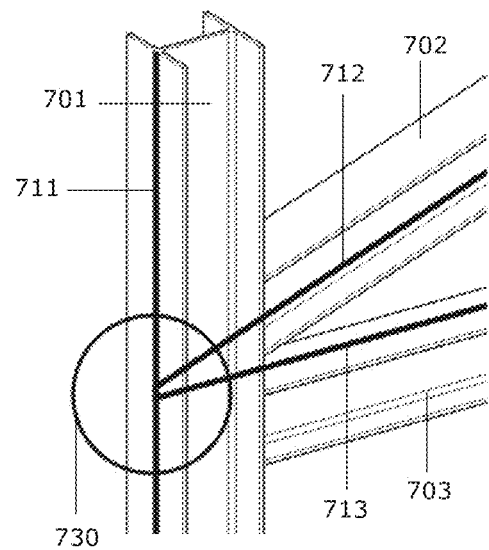
Figure 7B:
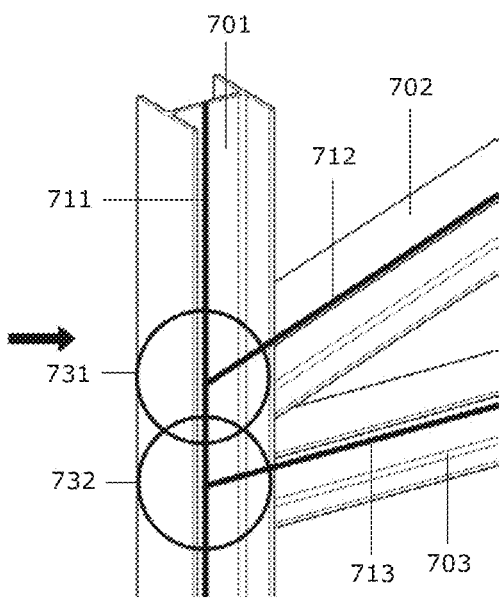

Possible relaxations are:

Splitting a node along an axis (FIGS. 7A and 7B).

Figure 8A:
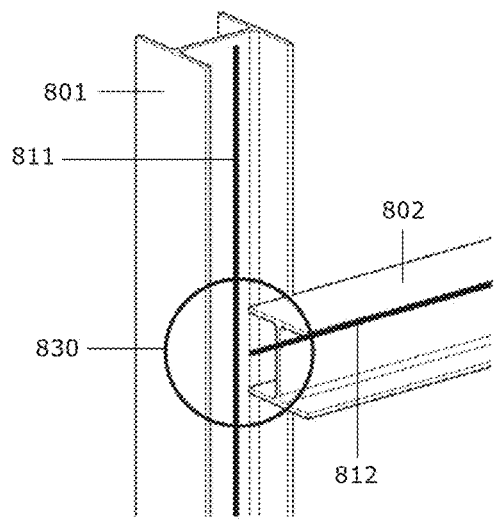
Figure 8B:
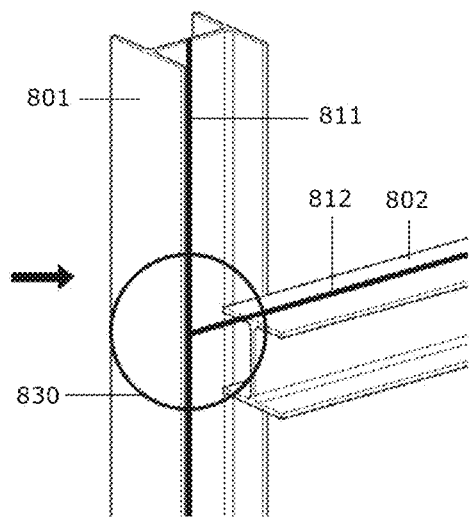

Relaxing axis bounds: profile bounds are extended outwards to the extreme positions in the profile directions of other elements in the node (FIGS. 8A and 8B).

Figure 9A:
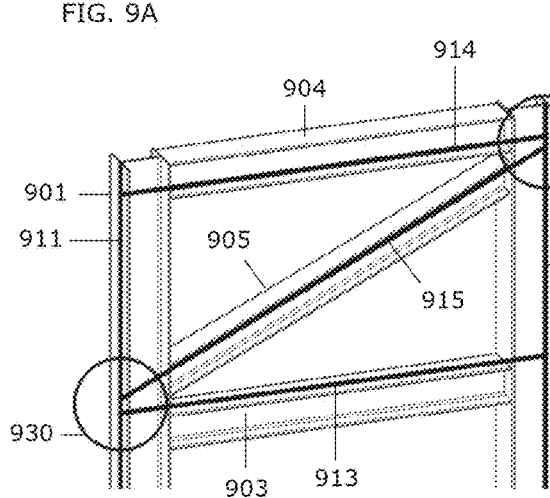
Figure 9B:
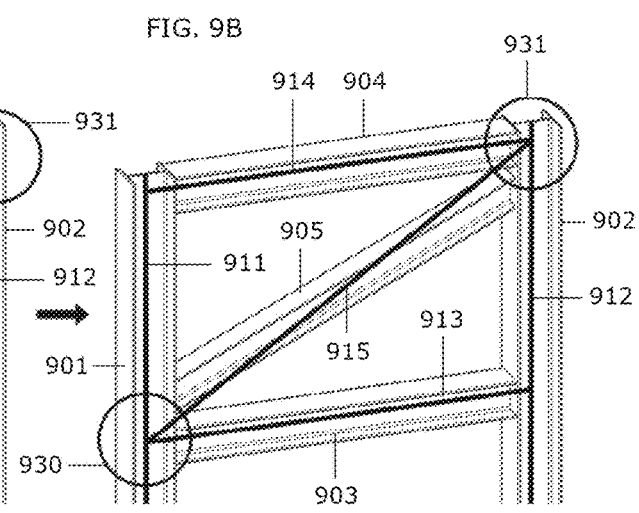

Relaxing parallelism to the center axis. Preferably, this relaxation type is limited to certain axes, e.g. for analytical axes of physical elements parallel to one of the main directions, this relaxation type is preferably not allowed (FIGS. 9A and 9B).

Figure 10A:
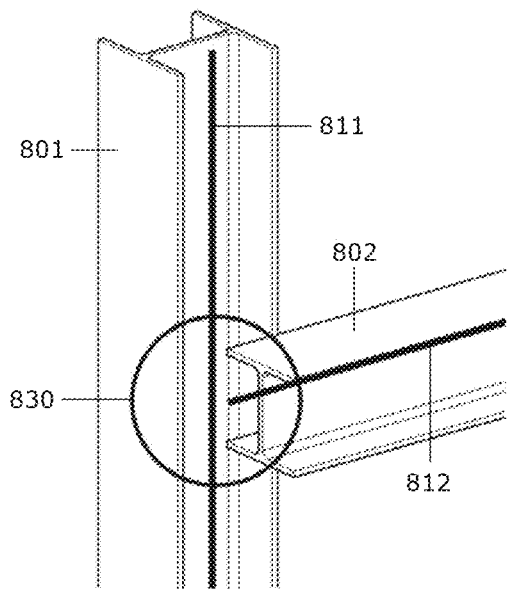
Figure 10B:
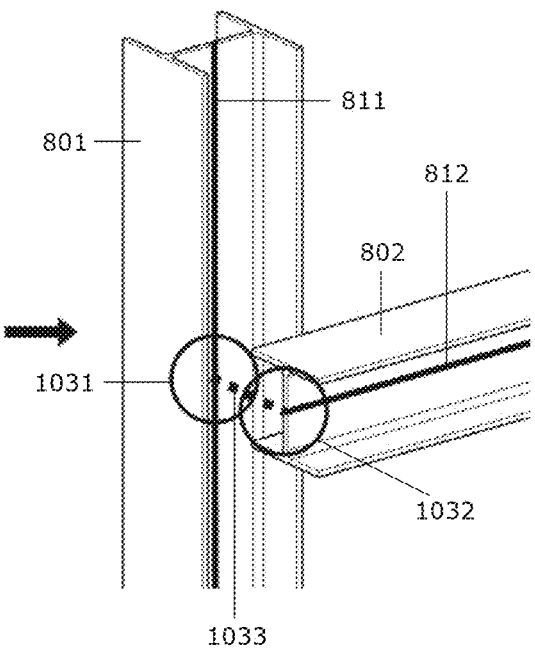

Splitting a node using a rigid link (FIGS. 10A and 10B).

FIGS. 7A and 7B show perspective representations of an embodiment of a CAD model comprising a column (701), a beam (703) and a member (702). In FIG. 7A, analytical axes 711, 712 and 713 corresponding to the column, the member and the beam, respectively, are associated with a common connection node (730). In order to make all analytical axes tangent to the connection node, analytical axis 711 is positioned at a profile bound in FIG. 7A. The same holds for the other analytical axes and their profile bounds. However, it is still not possible to make the other two analytical axes intersect in a common point on analytical axis 711. Instead, as shown in FIG. 7B, the connection node may be split up along analytical axis 711 into two new connection nodes (731, 732). The analytical axes (711, 712, 713) can then be positioned at the center of the respective profiles.

FIGS. 8A and 8B show perspective representations of an embodiment of a CAD model comprising a column (801) and a beam (802). Analytical axes 811 and 812 correspond with the column (801) and the beam (802), respectively. In FIG. 8A, analytical axis 812 is constrained to the profile bounds of the beam (802). However, within those profile bounds, no solution of both analytical axes (811, 812) intersecting in (i.e. being tangent to) the connection node (830) can be found. Referring to FIG. 8B, by relaxing the constraint related to the profile bounds, a solution with the analytical axes intersecting in (i.e. being tangent to) the connection node (830) can be found.

FIGS. 9A and 9B show perspective representations of an embodiment of a CAD model comprising a first column (901), a second column (902), a first beam (903), a second beam (904), and a member (905). Analytical axes 911, 912, 913, 914 and 915 correspond with the first column (901), the second column (902), the first beam (903), the second beam (904), and the member (905), respectively. The analytical axes for the columns and beams are blocked by their profile bounds. In FIG. 9A, analytical axis 915 is constrained to remain parallel to the center axis of the member (905). No simultaneous intersection of analytical axes 911, 913 and 915 in connection node 930 and intersection of analytical axes 912, 914 and 915 in connection node 931 can be obtained. In FIG. 9B, the parallelism constraint for analytical axis 915 is dropped. Corresponding intersecting solutions for connection nodes 930 and 931 can be found.

FIGS. 10A and 10B show perspective representations of the embodiment of the CAD model of FIGS. 8A and 8B, comprising a column (801) and a beam (802). Analytical axes 811 and 812 correspond with the column (801) and the beam (802), respectively. In FIG. 10A, analytical axis 812 is constrained to the profile bounds of the beam (802). However, within those profile bounds, no solution of both analytical axes (811, 812) intersecting in (i.e. being tangent to) the connection node (830) can be found. Referring to FIG. 10B, by splitting the connection node (830) into two new nodes (1031, 1032), interconnected via a rigid link (1033), a solution can be found.

Relaxations are gradually added and as conservatively as possible in order to minimally adjust the analytical model, until a solution is found. Several heuristics may be used for this.

In an embodiment, one or more optimization variables with largest contributions in the gradient of the cost function in the final approximate solution are identified, and relaxations corresponding to the one or more identified optimization variables are chosen.

In another preferred embodiment, one or more most problematic nodes are identified. A possible implementation is to determine the node with the largest node deviation, i.e. distance, to one of its associated axes and then return all nodes that have a node deviation above a predefined percentage of the maximal node deviation.

That predefined percentage poses a compromise between conservative relaxation (high percentage) and solution speed (low percentage, more relaxations at once, less cost function solutions).

For every most problematic node, a "relaxation direction" is identified. For each axis associated with the connection node which is not tangent to the connection node, a direction is determined. If there are axes on the profile bounds, the direction among those axes which is furthest from the center is chosen. If there are no axes on the profile bounds, the direction of the axis furthest from the center is chosen.

FIGS. 11A, 11B, 11C and 11D show a cross-sectional view of the embodiment of the profile (601) of FIG. 6. The position of the connection node (630) resides outside of the profile bounds.

Figure 11A:
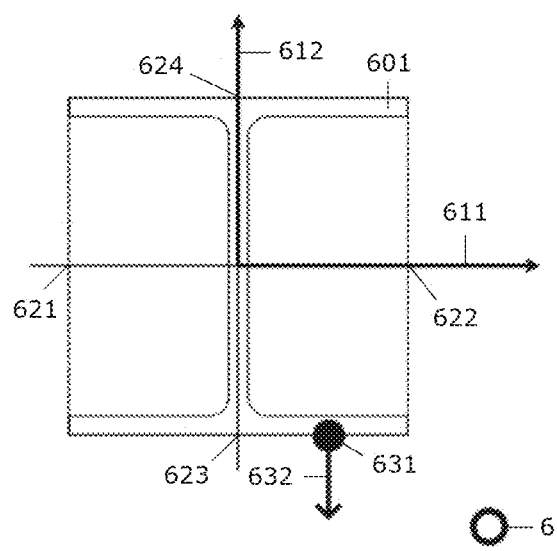

FIG. 11A shows an analytical axis (631) on profile bound (623) associated with the V-axis (612) in the negative direction. The relaxation direction (632) is chosen correspondingly.

Figure 11B:
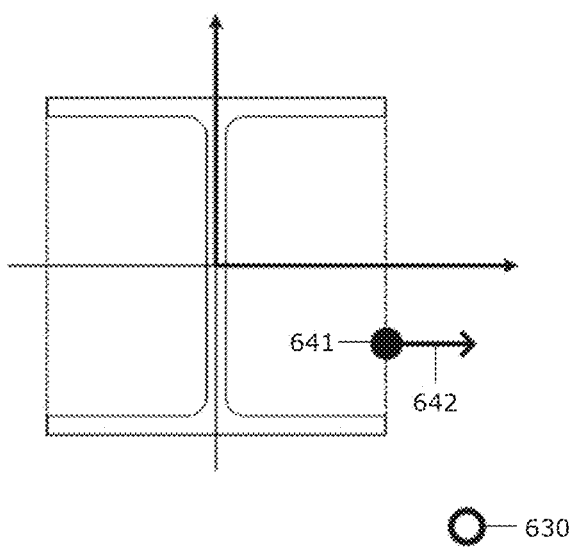

FIG. 11B shows an analytical axis (641) on profile bound (622) associated with the U-axis (611) in the positive direction. The relaxation direction (642) is chosen correspondingly.

Figure 11C:
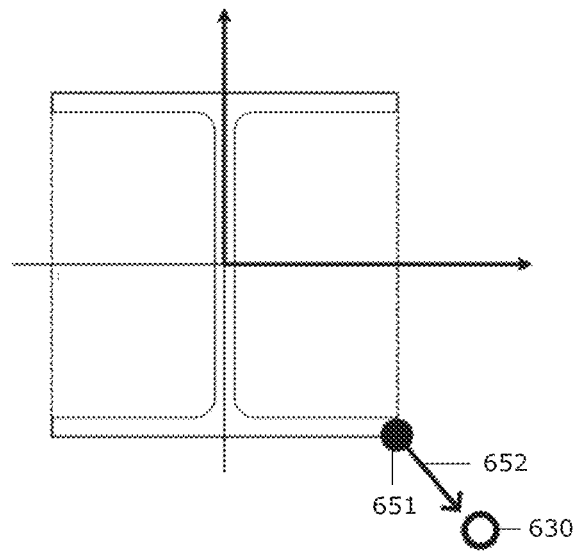

FIG. 11C shows an analytical axis (651) on each of the profile bounds (622, 623) associated with the V-axis (612) in the negative direction and the U-axis (611) in the positive direction. The relaxation direction (652) is chosen from the analytical axis (651) towards the position of the connection node (630).

Figure 11D:
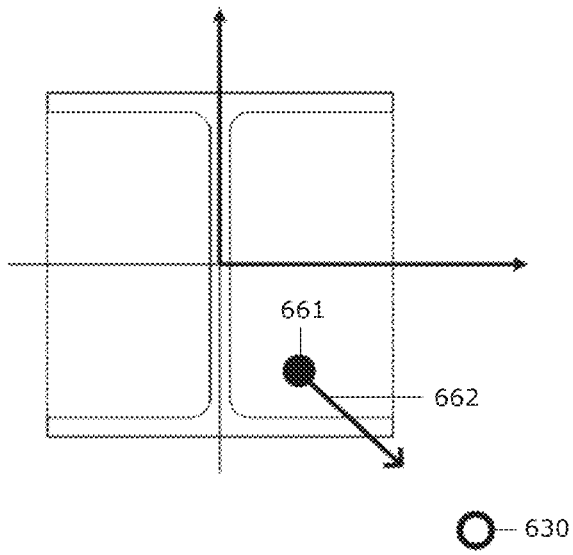

FIG. 11D shows an analytical axis (661) not positioned on an any profile bound. The relaxation direction (622) is chosen from the analytical axis (661) towards the position of the connection node (630).

Then, for each problematic node, the following cascade of relaxation trials is utilized (when one step succeeds, stop, otherwise, try the next step):

1. Try splitting the node along an axis. Try first the axes with direction closest to the relaxation direction. Only accept when the distance between the newly constructed candidate nodes is larger than half the current node sphere diameter.
2. Try relaxing the parallelism restriction for one of the axes in the nodes that is only connected at its start and end point. Try first for the axes with the lowest weight in the cost function.
3. Try to relax the profile bounds on the axes in the node.
4. Try relaxing the parallelism restriction for one of the axes in the nodes that is only connected at its start and end point and at most to one extra node. Try first for the axes with the lowest weight in the cost function.
5. Try splitting the node along an axis. Try first the axes with direction closest to the relaxation direction. Only accept when the distance between the newly constructed candidate nodes is larger than 0.1 times the current node sphere diameter.
6. Try relaxing the parallelism restriction for one of the axes in the nodes that is connected at its start and end point and to any number of other nodes. Try first for the axes with the lowest weight in the cost function.
7. Try splitting the node along an axis. Try first the axes with direction closest to the relaxation direction. Only accept when the distance between the newly constructed candidate nodes is larger than 0.01 times the current node sphere diameter.

If none of these relaxations was successful for any of the nodes, go over the nodes again and split them using rigid links. Use the relaxation direction for this as well: search for a split of the node that results in a node pair with an offset direction close to the relaxation direction.

In an embodiment, a machine learning technique may be utilized to train a strategy on a data set that contains analytical models (containing analytical axes and analytical nodes) for a large number of structural CAD models comprising physical elements.

4. Clean-Up Solves

After the initial solve, two extra clean-up solves are performed, after additional processing of the model. When such a solve fails, all changes it introduced are reverted, so they cannot result in an infeasible model.

First, connection nodes in the model that are nearly coinciding are searched for, and merging of the corresponding nodes is attempted. After that, new spatial configurations are computed with the standard relaxation strategy.

Second, axes that are close to one of the base positions of their profile are searched for. The base positions correspond to the nine positions in the two-dimensional cross section of the profile at a profile bound or centrally in between an opposite pair of profile bounds.

Figure 12:
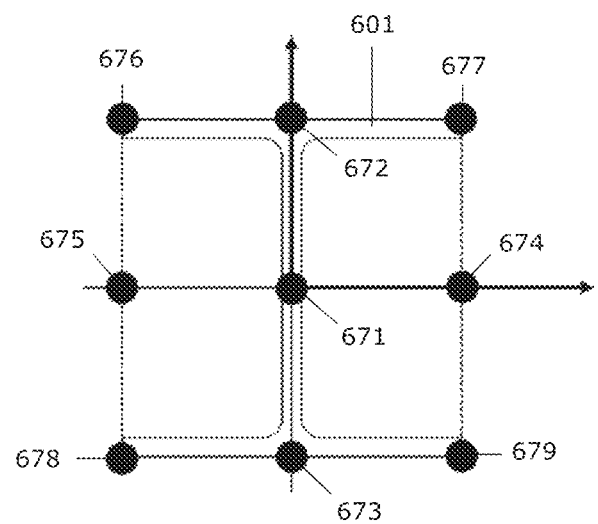

FIG. 12 shows a cross-sectional view of the embodiment of the profile (601) of FIG. 6, wherein the nine base positions 671, 672, 673, 674, 675, 676, 677, 678 and 679 have been indicated.

The position of these analytical axes is then adjusted to the corresponding base position and the corresponding bounds are adapted so that no deviation from this base position is allowed. Then, new spatial configurations are computed with adjusted relaxation strategy that resets the extra restrictions for the most problematic axes until a feasible solution is again found.

5. User Refinement

Before the initial solve, a user may be presented with a number of relaxation settings and may choose between them. E.g. he can choose to not allow deviation from parallelism or specify the maximal distance an axis can deviate from the center axis of an element. These settings are translated into tighter or more relaxed bounds during the core solve.

After the initial solve, a user may impose extra restrictions on the model or add relaxations. Examples are: merging nodes, forcing an axis in a specified base position, allowing relaxation of parallelism, . . . . Each time the user changes the model, a new solve is launched to make the model consistent. By default, the changes are kept local by keeping a large part of the model fixed and allowing only modifications to the neighborhood of the change. A user can also choose to do a global resolve, such that changes can propagate through the entire model.

By doing resolves, the user does not have to worry about consistency of the model and only has to focus on fine tuning the model based on his or her preferences.

6. Multiple Solutions

Multiple solutions for the same analytical model with the same connection nodes and (if present) rigid links may be possible. In order to discriminate between several solutions, a post-processing may be utilized which follows an optimization strategy to bring the model as close as possible to a desired configuration, while keeping the model consistent. For example: the weighted summed deviations of analytical axes from the corresponding center axes may be minimized in selecting one solution from multiple feasible solutions.

The invention claimed is:

1. A computer-implemented method for generating an analytical model of a structure, comprising the steps of:
obtaining automatically or via user input a computer-aided design model representing a structure and comprising a plurality of physical elements;
automatically generating based on the computer-aided design model an analytical model comprising analytical elements and analytical nodes, comprising the steps of:
generating for each of multiple physical elements an analytical element comprising an initial spatial configuration;
generating one or more connection nodes each associated with two or more analytical elements and comprising an initial spatial configuration, wherein at least one analytical element associated with a connection node is not tangent to the connection node;
computing simultaneously new spatial configurations for all analytical elements and all connection nodes via optimization of a cost function based on the spatial configurations of the analytical elements and connection nodes to make analytical elements associated with a connection node tangent to said connection node, wherein said cost function is based on relative distances between connection nodes and associated analytical elements, and wherein said optimization is a constrained optimization based on spatial constraints for one, multiple or all of the spatial configurations;

automatically displaying to a user via a graphical user interface a representation of the analytical model.

2. The computer-implemented method according to claim 1, comprising the step of obtaining from the user via the graphical user interface one or more changes of the analytical model, wherein each time a user change of the analytical model is obtained, an automatic computation of new spatial configurations is performed for at least some of the analytical elements and connection nodes of the analytical model, and wherein the displayed representation is updated accordingly.

3. The computer-implemented method according to claim 2, wherein a change comprises a restriction or relaxation on one or more analytical elements and/or a merging or splitting of one or more connection nodes.

4. The computer-implemented method according to claim 3, wherein a change comprises:
a restriction or relaxation on parallelism, absolute or relative distances, and/or absolute or relative angles between an analytical element and a corresponding physical element; and/or
a restriction or relaxation on containment of an analytical element within a directed bounding box enclosing a corresponding physical element; and/or
merging of two or more connection nodes into a new connection node; and/or
splitting of a connection node into two or more new connection nodes.

5. The computer-implemented method according to claim 1, wherein said displayed representation of the analytical model comprises representations of the analytical elements of the analytical model in spatial proximity of the corresponding physical elements.

6. The computer-implemented method according to claim 1, wherein said displayed representation of the analytical model comprises representations of the analytical elements of the analytical model overlaid over the corresponding physical elements.

7. The computer-implemented method according to claim 6, wherein said constrained optimization is based on an active set method comprising for each of the spatial constraints a state, wherein an unbounded conjugate gradient method with line search is utilized for optimization associated with a state of the active set.

8. The computer-implemented method according to claim 1, wherein the step of generating a connection node comprises:
constructing a connection graph comprising graph nodes and edges, wherein a graph node represents an analytical element, wherein an edge interconnects two graph nodes to satisfy a relative distance criterion of a relative distance of the corresponding analytical elements;
retrieving a clique from the connection graph for which the corresponding analytical elements satisfy a compactness criterion, wherein a clique is a set of two or more completely interconnected graph nodes;
generating the connection node based on said clique, wherein the connection node is associated with the analytical elements represented by the graph nodes of the clique.

9. The computer-implemented method according to claim 8, wherein the connection node is generated based on a maximal clique in the connection graph for which the corresponding analytical elements satisfy the compactness criterion, wherein a maximal clique is a clique which cannot be enlarged by addition of another graph node.

10. The computer-implemented method according to claim 9, wherein all maximal cliques for which the corresponding analytical elements satisfy the compactness criterion are recursively retrieved, and wherein for each maximal clique a connection node based on said maximal clique is generated.

11. The computer-implemented method according to a claim 8, wherein a relative distance between a pair of analytical elements is associated with a minimal distance point on each of the analytical elements of the pair, wherein verification of the compactness criterion for analytical elements corresponding with a clique comprises the steps of:
constructing a minimally enclosing sphere encompassing all minimal distance points associated with edges in between graph nodes of the clique;
verifying whether a size of the minimally enclosing sphere satisfies a size criterion, wherein the connection node comprises an initial spatial configuration coinciding with the center of the minimally enclosing sphere.

12. The computer-implemented method according to claim 1, wherein an analytical element is an analytical axis, wherein a spatial configuration of an analytical axis comprises a position and an orientation.

13. The computer-implemented method according to claim 1, wherein the analytical model is a wire frame model, wherein an analytical element is an analytical axis, wherein an initial spatial configuration of an analytical axis comprises a position and an orientation, wherein said step of generating one or more connection nodes each associated with two or more analytical elements and comprising an initial spatial configuration is the steps of:
computing for each pair of analytical axes a relative distance, wherein the relative distance is associated with a minimal distance point on each of the analytical axes of the pair;
constructing a connection graph comprising graph nodes and edges, wherein a graph node represents an analytical axis, wherein an edge interconnects two graph nodes in case the relative distance of the corresponding analytical axes satisfies a relative distance criterion;
recursively retrieving all maximal cliques for which the corresponding analytical axes satisfy a compactness criterion, wherein a clique is a set of two or more completely interconnected graph nodes, wherein a maximal clique is a clique which cannot be enlarged by addition of another graph node, wherein verification of the compactness criterion for analytical axes corresponding with a clique comprises: construction of a minimally enclosing sphere encompassing all minimal distance points associated with edges in between graph nodes of the clique; and verification whether a size of the minimally enclosing sphere satisfies a size criterion;
generating for each obtained maximal clique a connection node associated with the analytical axes represented by the graph nodes of the maximal clique, wherein the connection node comprises an initial spatial configuration comprising a position coinciding with the center of the minimally enclosing sphere of the maximal clique, wherein at least one of the analytical axes associated with a connection node is not tangent to the connection node.

14. The computer-implemented method according to claim 13, comprising the step of obtaining from the user via the graphical user interface one or more changes of the wire-frame model, wherein each time a user change of the wire-frame model is obtained, an automatic computation of new spatial configurations is performed for at least some of the analytical axes and connection nodes of the analytical model, and wherein the displayed representation is updated accordingly.

15. The computer-implemented method according to claim 1, comprising the step of storing the analytical model on a tangible non-transitory computer-readable storage medium.

16. The computer-implemented method according to claim 1, comprising the step of performing a computer-implemented structural analysis based on the analytical model.

17. A computer system for generating an analytical model of a structure, the computer system having a non-transitory computer-readable storage medium comprising computer-executable instructions that when executed by a computer cause the computer to perform a method comprising:
obtaining automatically or via user input a computer-aided design model representing a structure and comprising a plurality of physical elements;
automatically generating based on the computer-aided design model an analytical model comprising analytical elements and analytical nodes, comprising the steps of:
generating for each of multiple physical elements an analytical element comprising an initial spatial configuration;
generating one or more connection nodes each associated with two or more analytical elements and comprising an initial spatial configuration, wherein at least one analytical element associated with a connection node is not tangent to the connection node;
computing simultaneously new spatial configurations for all analytical elements and all connection nodes via optimization of a cost function based on the spatial configurations of the analytical elements and connection nodes to make analytical elements associated with a connection node tangent to said connection node, wherein said cost function is based on relative distances between connection nodes and associated analytical elements, and wherein said optimization is a constrained optimization based on spatial constraints for one, multiple or all of the spatial configurations;
automatically displaying to a user via a graphical user interface a representation of the analytical model.

18. A computer program product for generating an analytical model of a structure, the computer program product comprising a non-transitory computer-readable storage medium having computer-executable instructions which, when the computer program product is executed by a computer, cause the computer to carry out the steps of:
obtaining automatically or via user input a computer-aided design model representing a structure and comprising a plurality of physical elements;
automatically generating based on the computer-aided design model an analytical model comprising analytical elements and analytical nodes, comprising the steps of:
generating for each of multiple physical elements an analytical element comprising an initial spatial configuration;
generating one or more connection nodes each associated with two or more analytical elements and comprising an initial spatial configuration, wherein at least one analytical element associated with a connection node is not tangent to the connection node;
computing simultaneously new spatial configurations for all analytical elements and all connection nodes via optimization of a cost function based on the spatial configurations of the analytical elements and connection nodes to make analytical elements associated with a connection node tangent to said connection node, wherein said cost function is based on relative distances between connection nodes and associated analytical elements, and wherein said optimization is a constrained optimization based on spatial constraints for one, multiple or all of the spatial configurations;
automatically displaying to a user via a graphical user interface a representation of the analytical model.

* * * * *